United States Patent
Borate et al.

(10) Patent No.: US 10,275,317 B2
(45) Date of Patent: Apr. 30, 2019

(54) TIME-BASED DATA RETIREMENT FOR GLOBALLY DE-DUPLICATED ARCHIVAL STORAGE

(71) Applicant: Druva Technologies Pte. Ltd., Singapore (SG)

(72) Inventors: Milind Borate, Pune (IN); Shekhar S. Deshkar, Pune (IN)

(73) Assignee: DRUVA TECHNOLOGIES PTE. LTD., Singapore (SG)

( * ) Notice: Subject to any disclaimer, the term of this patent is extended or adjusted under 35 U.S.C. 154(b) by 439 days.

(21) Appl. No.: 15/071,482

(22) Filed: Mar. 16, 2016

(65) Prior Publication Data

US 2017/0212915 A1 Jul. 27, 2017

(30) Foreign Application Priority Data

Jan. 21, 2016 (IN) .............................. 201641002190

(51) Int. Cl.
*G06F 17/30* (2006.01)
*G06F 11/14* (2006.01)

(52) U.S. Cl.
CPC .... *G06F 11/1453* (2013.01); *G06F 17/30085* (2013.01)

(58) Field of Classification Search
CPC ........... G06F 11/1453; G06F 17/30303; G06F 17/30067; G06F 11/1446; G06F 17/30221; G06F 17/30073; G06F 17/30312; G06F 17/30085; G06F 17/30156
See application file for complete search history.

(56) References Cited

U.S. PATENT DOCUMENTS

| | | | |
|---|---|---|---|
| 5,604,862 A | 2/1997 | Midgely et al. | |
| 7,693,877 B1 * | 4/2010 | Zasman | H04L 67/1097 707/662 |
| 7,797,279 B1 | 9/2010 | Starling et al. | |
| 2005/0055519 A1 * | 3/2005 | Stuart | G06F 17/30082 711/159 |
| 2011/0093471 A1 * | 4/2011 | Brockway | G06F 17/30616 707/747 |
| 2012/0179656 A1 * | 7/2012 | Bunte | G06F 11/1451 707/667 |
| 2015/0261776 A1 * | 9/2015 | Attarde | G06F 17/30156 707/664 |

(Continued)

*Primary Examiner* — Leslie Wong
(74) *Attorney, Agent, or Firm* — Fenwick & West LLP (57) ABSTRACT

Data from computing devices is backed-up regularly, storing a snapshot of the data and corresponding metadata in a data store. The backup data are stored for a relatively short period of time before being archived to long-term storage. For snapshots with files with identical data that are not archived together, archive storage space and computing resources may be conserved by not storing duplicates of the data. When the data is added to the archive storage, the archive storage location is added to backup reference entries for other files with identical data. When all files referencing an archive storage location are expired from the backup data store, an archive retention period is initiated, and an entry is added to a time-based archive expiration database indicating the storage location and an expiration time for the archived data. At the expiration time, the archived data is designated for deletion from the archive.

20 Claims, 8 Drawing Sheets

(56) References Cited

U.S. PATENT DOCUMENTS

2015/0261792 A1* 9/2015 Attarde ............. G06F 17/30303
                                                    707/616
2016/0139836 A1* 5/2016 Nallathambi ......... G06F 3/0619
                                                    711/114

* cited by examiner

TIME-BASED DATA RETIREMENT FOR GLOBALLY DE-DUPLICATED ARCHIVAL STORAGE

CROSS REFERENCE

This application claims a benefit of, and priority to, India Patent Application No. 201641002190, filed Jan. 21, 2016, the contents of which are incorporated by reference in their entirety.

BACKGROUND

1. Field of Art

The disclosure generally relates to the field of data backup, and in particular to providing time-based data retirement for de-duplicated archival storage.

2. Background

Enterprises use data backup to protect against data loss. Often, data backup has multiple stages. Data may be backed up to one storage location for a period of time and then archived in another location thereafter. At each stage, computing resources and data storage are used for each backed up item. Backing up and archiving the same data multiple times uses computing resources and data storage and may increase the costs and complexity of data backup operations. Further, indexed-based archive data storage may be infeasible because the archive data storage is often off-line and unsearchable. Thus, locating archived data for deletion at the end of an archive retention period may be a resource-intensive task because locating the data may be difficult. For example, data may be located using a brute force approach of checking each entry in an archive catalogue.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Configuration Overview

A system, method, and non-transitory computer-readable medium provide backup and archive services for computing devices. In an example embodiment, data from the computing devices is backed-up regularly (e.g., hourly, daily, weekly, etc.), storing a snapshot of the data and corresponding metadata in a data store. Different snapshots often contain files with identical file data. The backup data are stored for a relatively short period of time (e.g., six months, one year, etc.) before being archived to long-term storage. For snapshots with files with identical data that are not archived together, archive storage space and computing resources may be conserved by not storing duplicates of the data. When the data is added to the archive storage, the archive storage location is added to backup reference entries for other files with identical data. Accordingly, when the other files are archived, catalogue entries for the files point to the archive storage location of the data and duplicate entries of the data are not created. When all files referencing an archive storage location are expired from the backup data store, an archive retention period is initiated, and an entry is added to a time-based archive expiration database indicating the storage location and an expiration time for the archived data. At the expiration time, the archived data is designated for deletion from the archive.

One embodiment of the method includes storing first file data from a first backup snapshot of a plurality of backup snapshots in an archive data store, the storing comprising copying the first file data from a backup snapshot store comprising deduplicated file data from the plurality of backup snapshots. The method further includes creating a first catalogue entry for the first backup snapshot, the first catalogue entry comprising a storage location of the first file data in the archive data store. The method further includes determining that the first file data is not associated with any other backup snapshot of the plurality of backup snapshots, designating the first file data for deletion from the backup snapshot store, and adding an archive expiration entry to an archive cleanup database, the archive expiration entry indicating an expiration time at which the first file data is designated for deletion for the archive data store.

One embodiment of the system includes a non-transitory computer-readable medium storing computer program code for creating an archive. When executed, the computer program code causes the system to store first file data from a first backup snapshot of a plurality of backup snapshots in an archive data store, the storing comprising copying the first file data from a backup snapshot store comprising deduplicated file data from the plurality of backup snapshots. The computer program code also causes the system to create a first catalogue entry for the first backup snapshot, the first catalogue entry comprising a storage location of the first file data in the archive data store. The computer program code also causes the system to determine that the first file data is not associated with any other backup snapshot of the plurality of backup snapshots, designate the first file data for deletion from the backup snapshot store, and add an archive expiration entry to an archive cleanup database, the archive expiration entry indicating an expiration time at which the first file data is designated for deletion for the archive data store.

One embodiment of the non-transitory computer-readable medium stores computer program code comprising instructions that are executable by one or more processors or computers. When executed, the computer program code causes the one or more processors to store first file data from a first backup snapshot of a plurality of backup snapshots in an archive data store, the storing comprising copying the first file data from a backup snapshot store comprising deduplicated file data from the plurality of backup snapshots. The computer program code also causes the one or more processors to create a first catalogue entry for the first backup snapshot, the first catalogue entry comprising a storage location of the first file data in the archive data store. The computer program code also causes the one or more processors to determine that the first file data is not associated with any other backup snapshot of the plurality of backup snapshots, designate the first file data for deletion from the backup snapshot store, and add an archive expiration entry to an archive cleanup database, the archive expiration entry indicating an expiration time at which the first file data is designated for deletion for the archive data store.

Exemplary Networked Computing Environment

Figure 1:
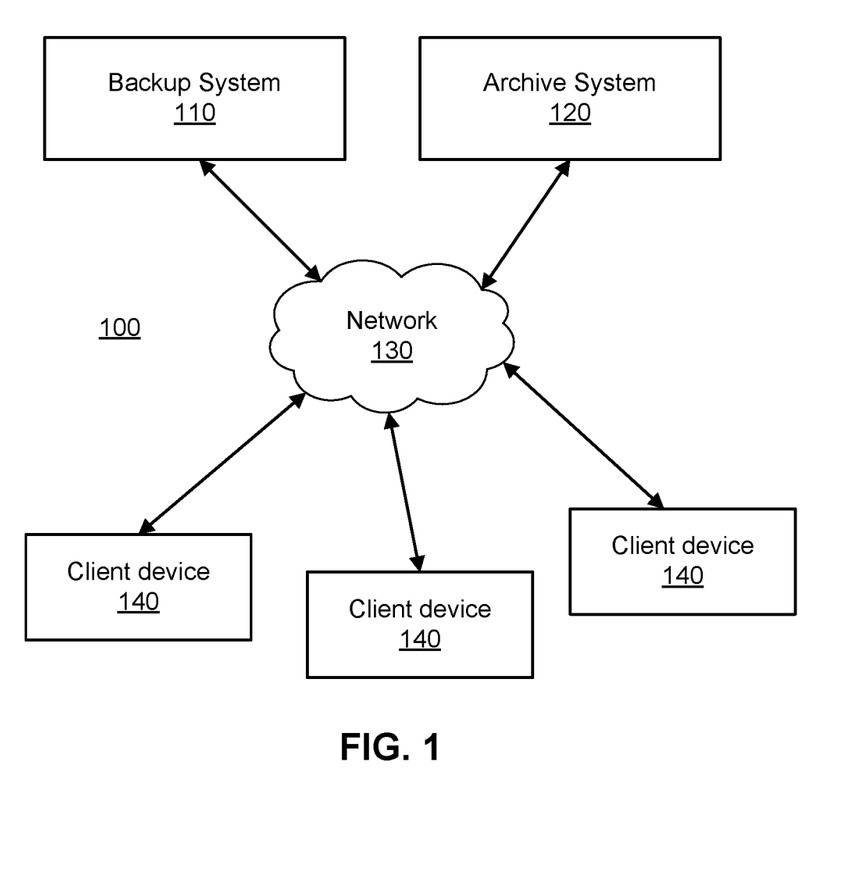
FIG. 1 is a high-level block diagram of a networked computing environment providing time-based data retirement for de-duplicated archival storage, according to one embodiment.

FIG. (FIG. 1 shows a networked computing environment 100 suitable for providing time-based data retirement for de-duplicated archival storage, consistent with one example embodiment. The networked computing environment may be maintained by an enterprise, university, or other entity providing backup and archive services for data stored on computing devices. In the embodiment shown in FIG. 1, the networked computing environment 100 includes client devices (client computing devices) 140, a backup system (backup system computing device) 110, and an archive system (archive system computing device) 120, all connected via a network 130. In other embodiments, the networked computing environment 100 contains different or additional elements. In addition, the functions may be distributed among the elements in a different manner than described herein. For example, in one embodiment, a single system provides the functionality attributed to the backup system 110 and archive system 120.

The client devices 140 are computers that store data that will be backed up. In one embodiment, the client devices 140 are desktop and laptop computers, but they may include personal digital assistants (PDAs), smartphones, tablets, and the like. In another embodiment, the client devices 140 may include application servers such as SQL servers, Oracle servers, File-servers. The client devices 140 may be physical servers or virtual servers. Although only three client devices 140 are shown in FIG. 1, the networked computing environment 100 may include many more (e.g., hundreds of) client devices. An example computing device architecture is described with FIG. 7.

The backup system 110 creates and stores backups of data stored on the client devices 140. In one embodiment, the backup system 110 receives snapshots and corresponding metadata from the client devices 140. The backup system 110 stores the snapshots and creates/updates a searchable index using the metadata. Exemplary embodiments of the backup system 110 are described in detail below, with reference to FIG. 2.

The archive system 120 creates and stores archives of the backup data for long-term storage. Note that although the archive system 120 is shown as connected to the network 130, in some implementations, the archive data is stored on non-transitory media (e.g., magnetic tape, optical, or solid state memory or drive) that are not network-accessible without physically connecting them to a computer system. In one embodiment, the archive system 120 receives a plurality of snapshots to be archived together (e.g., all snapshots from a particular month) from the backup system 110. The archive system 120 creates an archive including the data in the snapshots and a catalogue including the corresponding metadata, including the location of each file in the archive. In this embodiment, the catalogue is stored as a serial list of entries that is searchable only using brute force techniques. Exemplary embodiments of the archive system and the catalogue are described in detail below, with reference to FIGS. 3-6.

The network 130 communicatively couples the client devices 140, backup system 110, and archive system 120. In one embodiment, the network 130 is the internet or an intranet and uses standard communications technologies and protocols. Thus, the network 130 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 130 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 130 can be represented using technologies and formats including image data in binary form (e.g., Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 130 can use custom or dedicated data communications technologies instead of, or in addition to, the ones described above. Although FIG. 1 shows the various elements communicating via a single network 130, in some embodiments different elements communicate via different networks. For example, the client devices 140 may communicate with the backup system 110 via one network, while the backup and archive systems may communicate with each other via another.

Exemplary Backup and Archiving Systems

Figure 2:
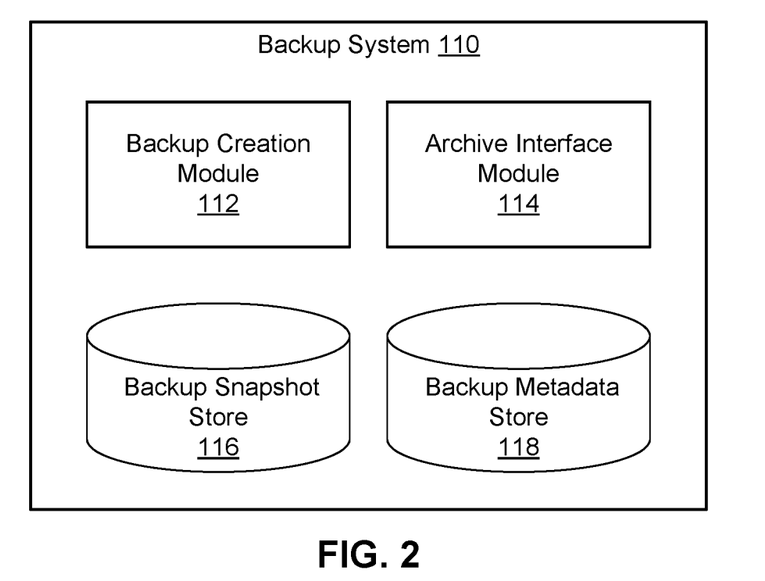
FIG. 2 is a high-level block diagram illustrating one embodiment of a backup system, for example, such as the one shown in FIG. 1.

FIG. 2 shows one embodiment of the backup system 110 suitable for use in the networked computing environment 100. In the embodiment shown in FIG. 2, the backup system 110 includes a backup creation module 112, an archive interfacing module 114, a backup snapshot store 116, and a backup metadata store 118. In other embodiments, the backup system 110 contains different or additional elements. In addition, the functions may be distributed among the elements in a different manner than described herein. For example, in one embodiment, the backup snapshot store 116 and the backup metadata store 118 are combined and provided as a single data store. It is noted that the modules here and elsewhere may be computing modules embodied and hardware, software, or a combination thereof. For example, software modules may be embodied as program code (e.g., instructions) stored in as computing storage and executed by a processor of a computing device such as described with FIG. 7. A hardware module (and combination thereof) may be embodied by an application specific integrated circuit (ASIC) or field programmable array (FPGA).

The backup creation module 112 creates backups of data stored on the client devices 140. The backups may be triggered by either the backup system 110 or the client device 140, either on a regular schedule or in response to user input. In one embodiment, the backup creation module 112 polls each user client device 140 at a set time each day and receives files to be backed up and corresponding metadata, such as file names, file sizes, access time-stamps, access control information, and the like. The backup creation module 112 stores a snapshot of the files currently located on the client device 140 in the backup snapshot store 116 and stores the corresponding metadata in the backup metadata store 118. In other embodiments, the backup creation module 112 leverages data from previous backup cycles to maintain the backup data store 116 as a deduplicated data store by not storing duplicate blocks of data. One of skill in the art will appreciate various methods and techniques for achieving this. For example, the backup creation module 112 may create a backup reference entry in the backup metadata store 118 for each file as it is stored in the backup snapshot store 116. In one embodiment, the backup reference entry includes a file identifier such as a checksum, a storage location of the file, and may be stored with other file metadata. In this embodiment, the backup creation module may use the backup reference entry to determine whether file data in an incoming snapshot is already stored in the backup snapshot store 116. For example, the backup creation module 112 may compute a checksum of new data and compare it to backup reference entries in the backup metadata store 118 to determine whether file data is already available in the backup snapshot store 116. If the backup creation module 112 determines from a first backup reference entry that the data is already stored in the backup snapshot store 116, the backup creation module 112 may create a second backup reference entry in the backup metadata store 118 that includes the location of the data, as determined from the first backup reference entry. In this embodiment, duplicate file data is not stored in the backup snapshot store 116, and multiple index entries in the backup metadata store 118 may point to the same data storage location. As a result, the use of storage space may be reduced compared to other methods that store duplicate file data. Further, because writing data to the backup snapshot store 116 uses computing resources, the use of computing resources may be reduced compared to other methods that store duplicate file data.

The archive interface module 114 provides an interface for the archive system 120 to access the snapshots, file data, and corresponding metadata stored in the backup snapshot store 116 and the backup metadata store 118, respectively. In one embodiment, the archive interface module 114 is configured to (1) identify snapshots that are ready to be archived; (2) add archive locations to backup reference entries; (3) delete backup reference entries and the corresponding metadata once a snapshot has been archived; and (4) delete file data once all files corresponding to the file data have been archived. In other embodiments, the archive interface module 114 is configured to provide different or additional functionality to the archive system 120. How these functions are used is described in detail below, with reference to the archive system 120 and FIG. 3.

The backup snapshot store 116 and backup metadata store 118 are one or more non-transitory computer-readable storage media that store the snapshots and corresponding metadata, respectively. Although FIG. 2 shows them as separate elements, a single computer-readable storage medium (or set of storage media) may be used to store both the snapshots and the corresponding metadata. In one embodiment, the snapshots are stored as raw blocks of data and the corresponding metadata is stored in a searchable database. The metadata describing each file included in the corresponding snapshot includes one or more pointers indicating where the file can be found in the backup snapshot store 116.

Figure 3:
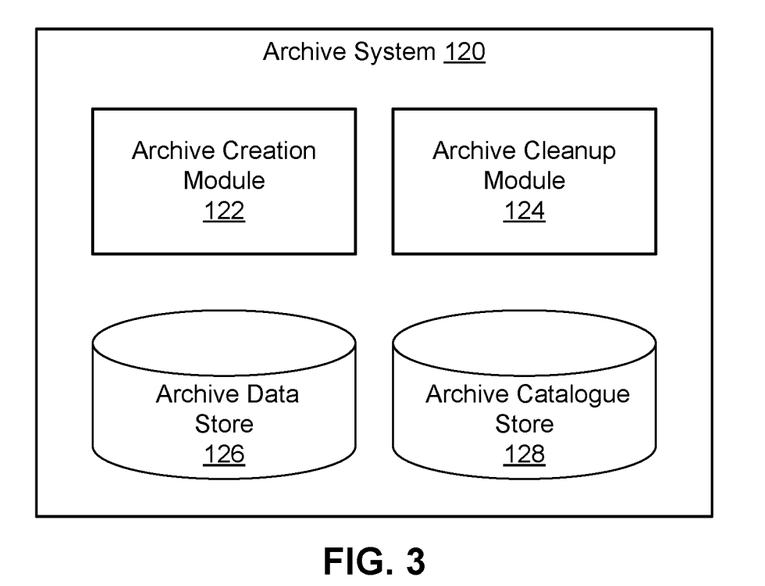
FIG. 3 is a high-level block diagram illustrating one embodiment of an archive system such as the one shown in FIG. 1.

FIG. 3 shows one embodiment of an archive system 120 suitable for use in the networked computing environment 100. In the embodiment shown in FIG. 3, the archive system 120 includes an archive creation module 122, an archive cleanup module 124, an archive data store 126, and an archive catalogue store 128. In other embodiments, the archive system 120 contains different or additional elements. In addition, the functions may be distributed among the elements in a different manner than described herein. For example, in one embodiment, the archive data store 126 and the archive catalogue store 128 are combined and provided as a single data store.

The archive creation module 122 creates archives of backup snapshots after a backup retention period has expired. In one embodiment, the archives are created on a fixed schedule. For example, the archive creation module 122 may archive all snapshots created in a month the last day of the same month the next year, thus making the backup retention period one year. Typical implementations use a backup retention period in the range of six months to two years, although other periods may be used. In other embodiments, other methods are used to trigger archiving, such as requiring a human operator to initiate the archiving and provide the time-range for which snapshots will be archived.

In various embodiments, the archive creation module 122 identifies one or more backup snapshots that are due to be archived, for example, based on the age of the snapshots. The archive creation module 122 stores the files and folders included in the snapshots in the archive data store 126. If multiple snapshots include identical copies of the same file or folder, the archive creation module 122 may only include a single copy in the archive data store 126 to increase storage efficiency and conserve computing resources. The archive creation module 122 also creates a catalogue for the archive and stores it in the archive catalogue store 128. Exemplary structures for the archive and catalogue are described in detail below, for example, with reference to FIGS. 4-6.

In one embodiment, for file data added to the archive data store 126, the archive creation module 122 determines whether the file data corresponds to files in other snapshots. For example, the archive creation module 122 may check backup reference entries to determine whether particular file data corresponds to one or more files in other snapshots. If a backup reference entry for the file data points to an additional file in another snapshot in the backup data store 116, the archive creation module 122 adds to the location of the file data in the archive data store 126 to the additional file's backup reference entry in the backup metadata store 118. The backup reference entry associates the additional file in the backup data store 116 to the storage location of the file data in the archive data store 126 so that when the additional file is archived, it need not be stored again in the archive data store. Instead, the archive creation module 122 can use the backup reference entry to create a catalogue entry for the file that points to the storage location of the file data. As a result, the use of storage space and computing resources may be reduced compared to other methods that archive duplicate file data.

The archive cleanup module 124 determines when archives can be deleted and removes them from the archive catalogue store 128. Typically, archives are retained for ten to fifteen years, although other archive retention periods may be used. In one embodiment, the archive retention period does not begin until all of the files included in the archive are no longer present in the current backup snapshots generated by the backup creation module 112. In one embodiment, when the archive retention period begins, the archive cleanup module 124 adds an entry to a time-based archive cleanup database in the archive data store 126 that indicates an expiration time of the archive. The archive expiration entry indicates an expiration time at which the first file data is designated for deletion from the archive data store 126. The archive expiration entry further indicates a storage location in the archive data store 126 so that the file may be located for deletion. One of skill in the art will recognize various ways for determining the point at which the archive retention period for a given archive begins. Once the archive retention period expires, the archive cleanup module 124 flags the archive for deletion, making the corresponding storage space available for new archives.

The archive data store 126 and archive catalogue store 128 are one or more non-transitory computer-readable storage media that store the archive data and corresponding catalogues, respectively. Although FIG. 3 shows them as separate elements, a single computer-readable storage medium (or set of storage media) may be used to store both the archive data and the catalogues. In one embodiment, the archive data are stored as raw blocks of data and the catalogue is stored as a serial list on entries denoting creation version, deletion version, and location in the archive of each file. The creation version indicates the first snapshot in which the file appears, while the deletion version indicates the last snapshot in which the file appears. Alternatively, the deletion version may indicate the first snapshot in which the file does not appear. If a file is still present in the last snapshot in an archive, the deletion version is set to infinity, indicating that the file may still be present on the client device 140 and may appear in future snapshots. Note that although the term infinity is used, this should not be taken to require the storage of any particular value. It is merely used to denote that the deletion version is set to a value or values that the system interprets as indicating the file is yet to be deleted from the client device 140 (or was deleted after the last backup). Thus, the metadata entries do not have to be duplicated for in the catalogue for each snapshot.

Exemplary Data Structures

Figure 4:
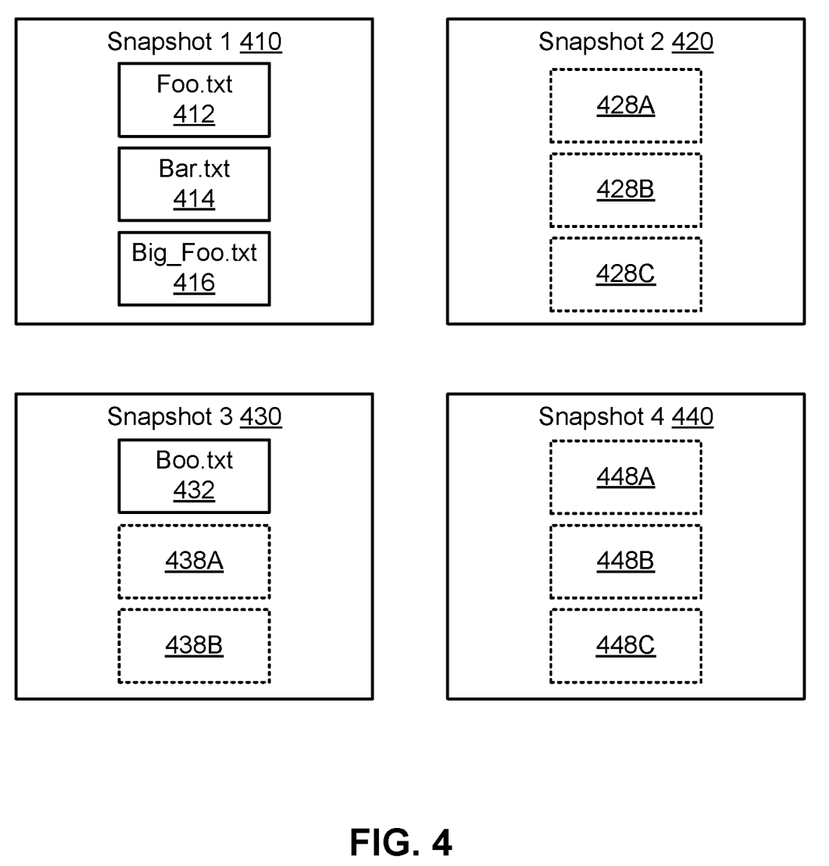
FIG. 4 is a high-level block diagram illustrating a set of backup snapshots for archiving, according to one embodiment.

FIG. 4 shows a set of snapshots 410, 420, 430, 440 containing files for archiving, consistent with one embodiment. The set of snapshots collectively includes files Foo.txt 412, Bar.txt 414, and Big_Foo.txt 416, and Boo.txt 432. The set of snapshots further includes files 428A-C, 438A-B, and 448A-C for purposes of illustration, the names of which are omitted for clarity. In practice, snapshots will typically include many more (e.g., hundreds, thousands, or more) files. In an example scenario, the four snapshots are received in sequence and reflect changes to the files on the corresponding client device 140. For example, the first snapshot 410, received first, includes Foo.txt 412, Bar.txt 414, and Big_Foo.txt 416. The second snapshot 420, received second, includes files 428A-C, but does not include the files 412, 414, 416 from the first snapshot because the files 412, 414, 416 have been removed from the client device 140. The third snapshot 430, received third, includes Boo.txt 432 and files 438A-B. The fourth snapshot 440, received fourth, includes files 448A-C, but does not include Boo.txt 432 because the file Boo.txt 432 has been removed from the client device 140.

In the example of FIG. 4, the file data associated with Boo.txt 432 and the file data associated with Foo.txt 412 are the same. When the first snapshot 410 is received, the backup creation module 112 retrieves and stores the file data and creates a backup reference entry in the backup metadata store 118 that associates Foo.txt 412 with the storage location of the file data. Accordingly, when the third snapshot 430 is received, the backup creation module 112 determines from the backup reference entry that the file data is already stored in the backup snapshot store 116, and the backup creation module 112 does not have to retrieve and store the file data again. The backup creation module 112 creates a second backup reference entry that associates Boo.txt 432 with the storage location of the file data.

Similarly, when the first snapshot 410, including Foo.txt 412, is archived, the archiving interface module 114 determines from the second backup reference entry that the file data corresponding to Foo.txt 412 also corresponds to Boo.txt 432. Accordingly, the archive interface module 114 adds the storage location of the file data in the archive data store 126 to the backup metadata store 118 that associates Boo.txt 432 with the storage location of the file data in the archive data store 126. As a result, when the third snapshot 430, including Boo.txt 432, is archived, the archive interface module 114 determines from the backup reference entry in the backup metadata store 118 that the file data is already stored in the archive data store 126. As a result, the archive creation module 122 does not have to retrieve and store the file data, which conserves computing resources and storage space.

Figure 5:
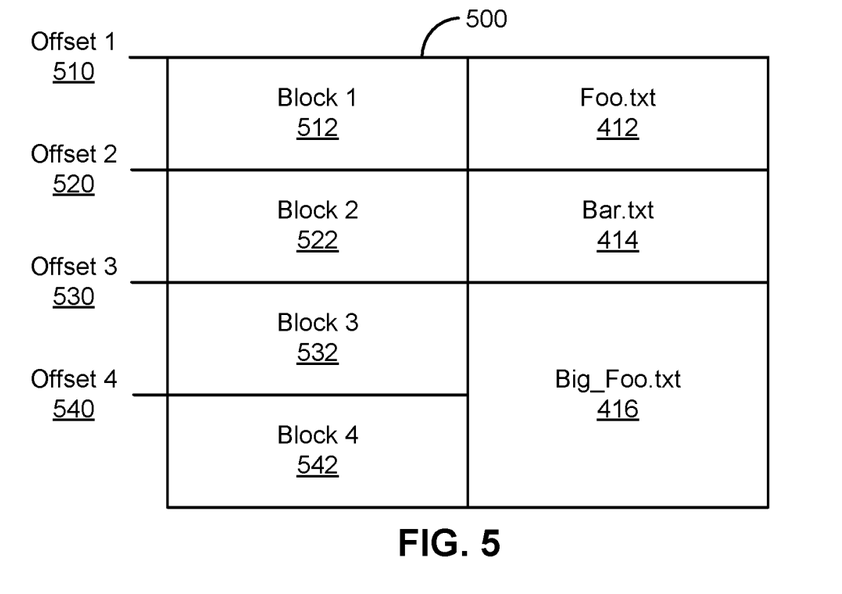
FIG. 5 is a high-level block diagram illustrating an archive, according to one embodiment.

FIG. 5 shows one embodiment of the archive 500 created from the set of snapshots shown in FIG. 4. In the embodiment shown in FIG. 5, the first file (Foo.txt) 412 is stored in a first block 512 at a first offset 510. Similarly, the second file (Bar.txt) 414 is stored in a second block 522 at a second offset 520. However, the third file (Big_Foo.txt) 416 is larger and requires more than one block in the archive 500. Therefore, the third file 416 is stored in both a third block 532 and a fourth block 542, at a third offset 530 and a fourth offset 540, respectively. In other embodiments, other archive structures are used.

Figure 6:
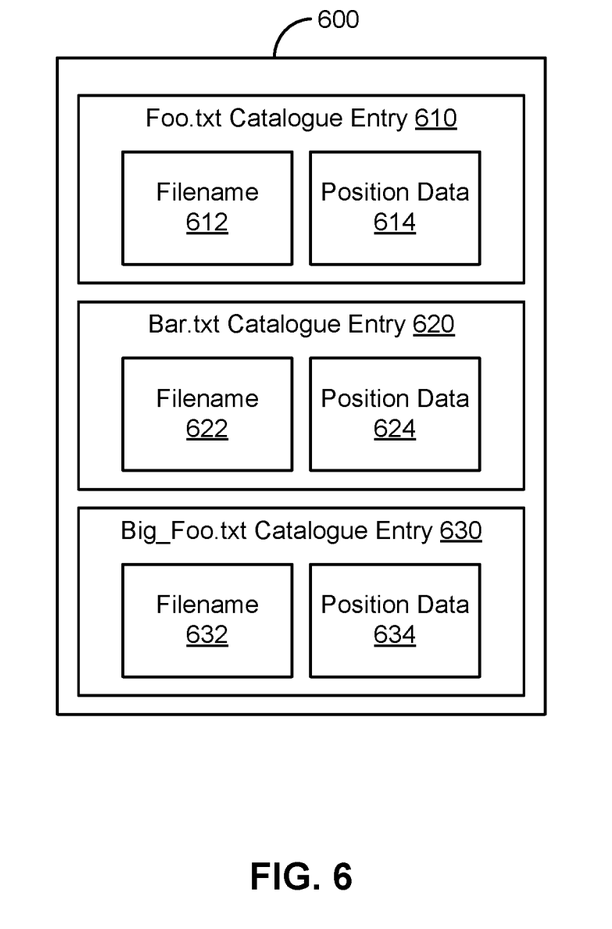
FIG. 6 is a high-level block diagram illustrating a catalogue corresponding to the archive shown in FIG. 5, according to one embodiment.

FIG. 6 shows one embodiment of the catalogue 600 corresponding to the archive 500 shown in FIG. 5. In the embodiment shown in FIG. 6, the catalogue 600 has a first entry 610, a second entry 620, and a third entry 630. The first entry 610 relates to Foo.txt 412 and includes a filename 612 (Foo.txt) and position data 614 (block one 512 at offset one 510). The second entry 620 relates to Bar.txt 414 and includes a filename 622 (Bar.txt) and position data 624 (block two 522 at offset two 520). The third entry 630 relates to Big_Foo.txt 416 and includes a filename 632 (Big_Foo.txt) and position data 634 (blocks three 532 and four 534 at offsets three 530 and four 540, respectively). In other embodiments, the catalogue 600 includes different or additional data. Furthermore, the metadata may be arranged in a different manner.

Computing System Architecture

Figure 7:
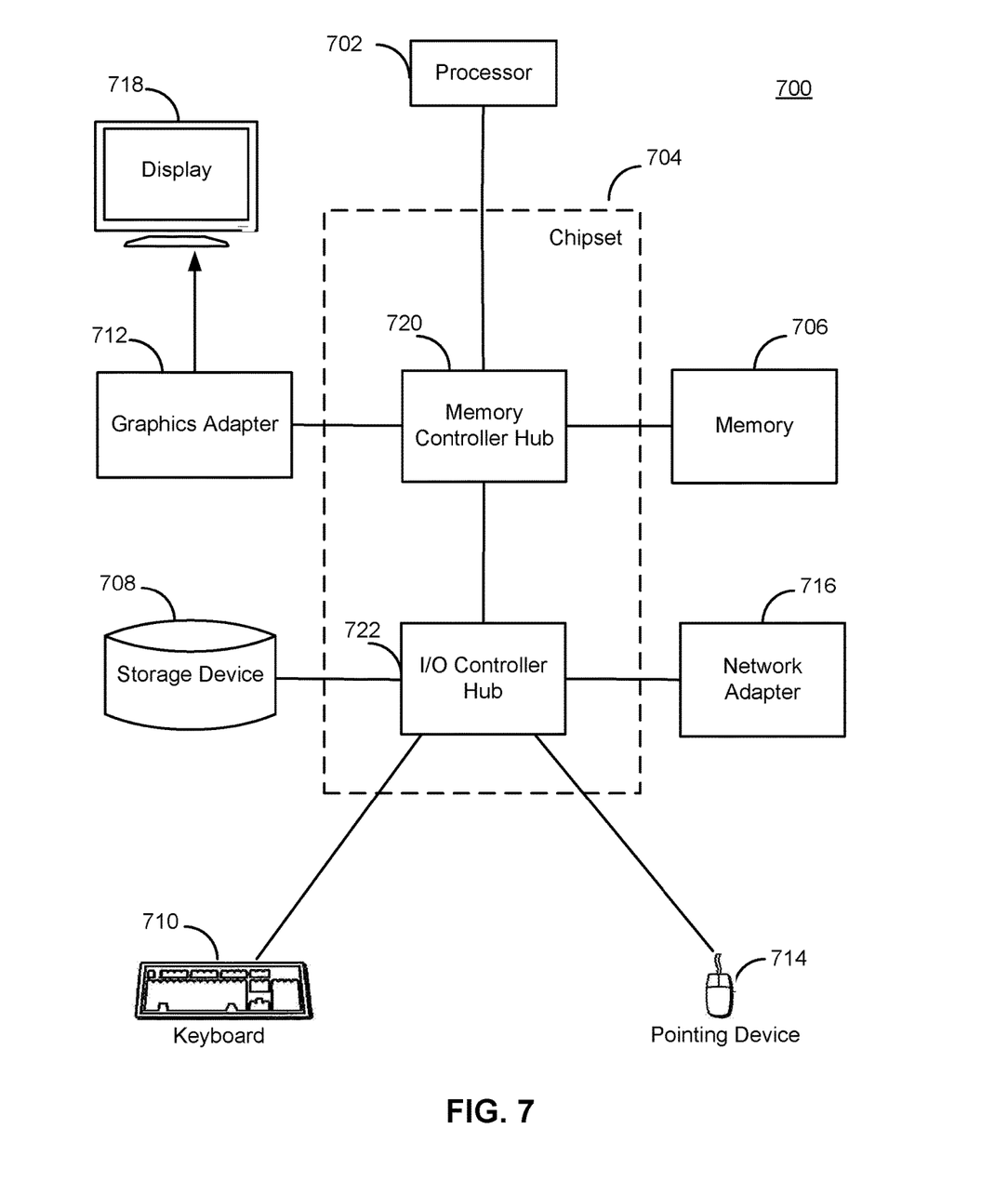
FIG. 7 is a high-level block diagram illustrating a computer suitable for use in the networked computing environment, according to one embodiment.

FIG. 7 is a high-level block diagram illustrating an example computer 700 suitable for use as a backup system 110, archive system 120, or client device 140. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, or other type of pointing device, and is used in combination with the keyboard 710 to input data into the computer system 700. The graphics adapter 712 displays images and other information on the display 718. The network adapter 716 couples the computer system 700 to one or more computer networks, such as network 130.

The types of computers used by the entities of FIGS. 1-3 can vary depending upon the embodiment and the processing power required by the entity. For example, the backup system 110 might include a distributed database system comprising multiple blade servers working together to provide the functionality described herein. Furthermore, the computers can lack some of the components described above, such as keyboards 710, graphics adapters 712, and displays 718. In addition, the example computer 700 provides the architecture to execute the processes below in FIGS. 8 and 9 in addition to those of FIGS. 1-3.

Exemplary Methods

Figure 8:
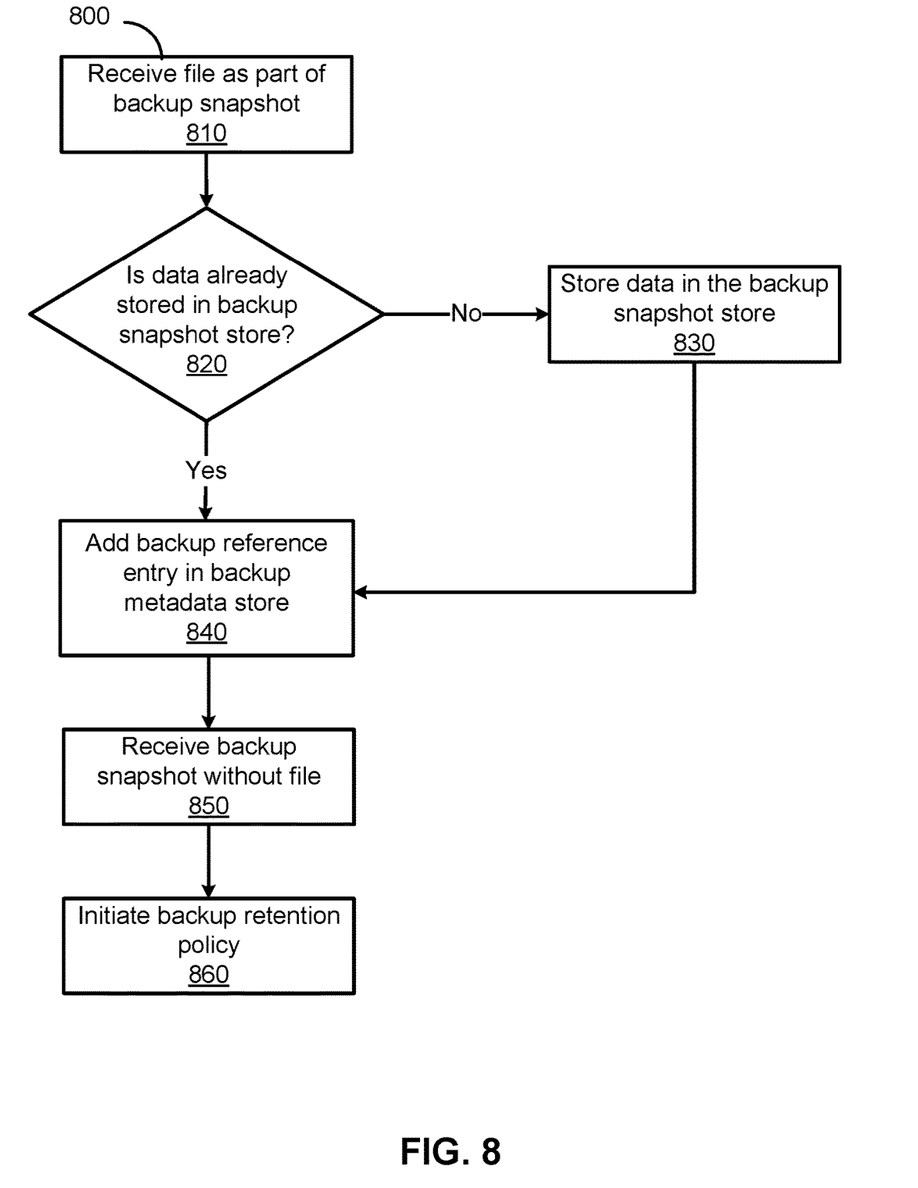
FIG. 8 is a flow chart illustrating a method for receiving and storing a snapshot and initiating a backup retention policy, according to one embodiment.

FIG. 8 illustrates one embodiment of a method 800 for receiving and storing a snapshot and initiating a backup retention policy. The steps of FIG. 8 are illustrated from the perspective of the backup system 110 and archive system 120 performing the method 800. However, some or all of the steps may be performed by other entities or components. In addition, some embodiments may perform the steps in parallel, perform the steps in different orders, or perform different steps. Note that, for clarity, the method 800 is described with reference to a hypothetical scenario where a single client device's files are being backed up. In practice, the data from many (e.g., hundreds of) client devices 140 will be backed up by the system. Further, steps of the method can be performed by a computer such as computer 700.

The method 800 begins with the backup subsystem 110 receiving 810 a snapshot that includes a file from a client device 140. In one embodiment, the received snapshot includes the data from the client device 140 that are subject to backup. In one embodiment, the backup system 110 also receives metadata corresponding to the snapshot, including file names, time-stamps, and access-control information for the files. In other embodiments, the backup system 110 initially receives only the metadata and requests only that data which is not already available in the backup snapshot store 116 from previous backup cycles.

The backup system 110 determines 820 whether the file data associated with the file is already available in the backup snapshot store 116. As discussed above with respect to FIG. 2, one of skill in the art will appreciate various methods and techniques for performing this step. If the file data is available, the process proceeds to step 840. If the file data is not available, the backup system 110 stores 830 the file data in the backup snapshot store 116. The backup system 110 then adds 840 a backup reference entry in the backup metadata store 118.

The backup system 110 then receives 850 a backup snapshot that does not include the received file. In one embodiment, this indicates that the received file has been removed or changed on the client device 140. The backup system 110 may receive additional snapshots that do contain the received file before step 850. The backup system 110 then initiates 860 a backup retention policy, such as initiating a backup retention period. According to the backup retention policy, various actions or events trigger the creation of an archive. For example, an archive may be created 1 year after the backup system 110 receives the last backup snapshot with the received file.

Figure 9:
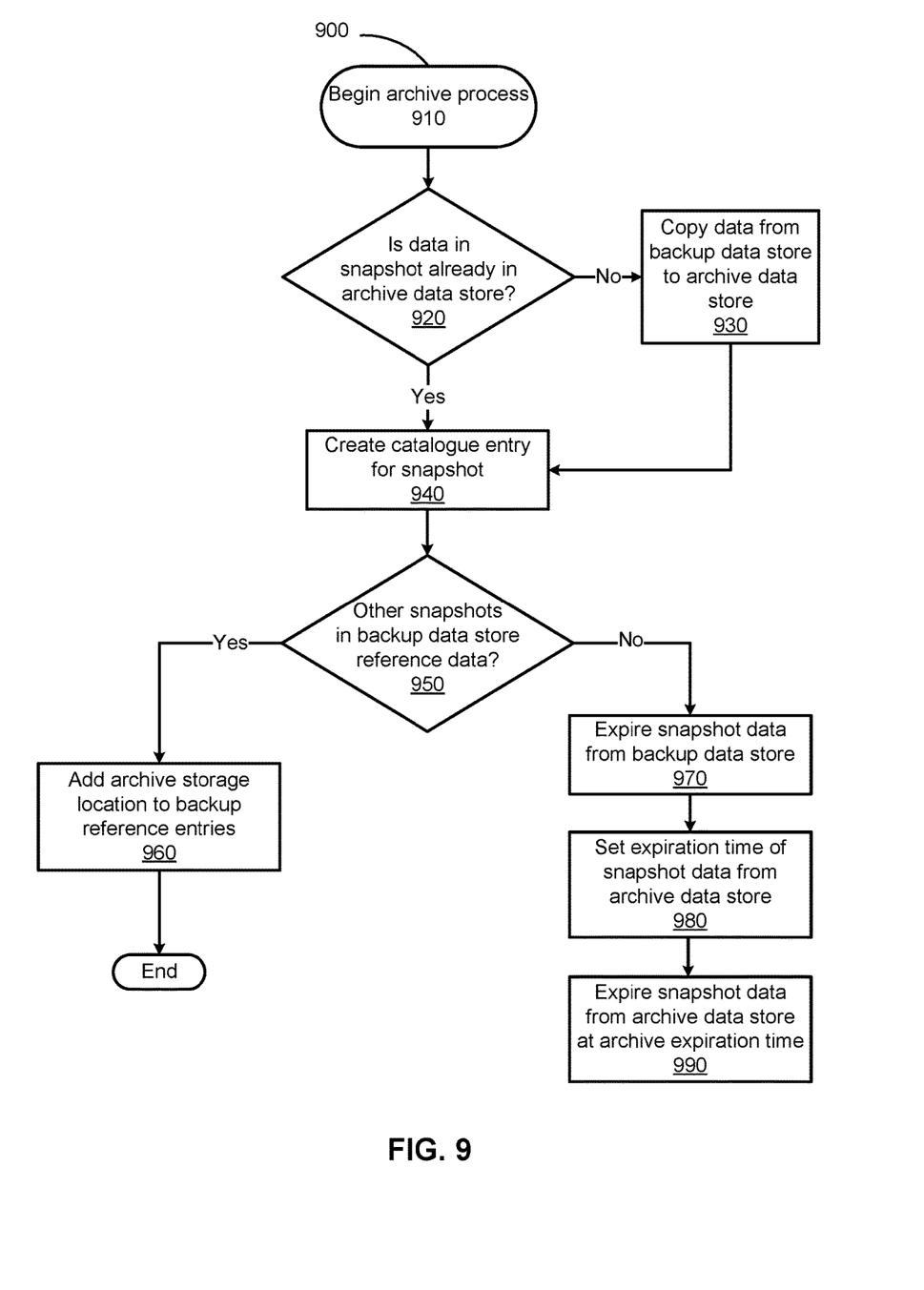
FIG. 9 illustrates one embodiment of a method for creating an archive with time-based retirement from a backup snapshot.

FIG. 9 illustrates one embodiment of a method 900 for creating an archive with time-based retirement from a backup snapshot. The steps of FIG. 9 are illustrated from the perspective of the archive system 120 performing the method 900. However, some or all of the steps may be performed by other entities or components. In addition, some embodiments may perform the steps in parallel, perform the steps in different orders, or perform different steps. The steps described can be performed by one or more computers such as computer 700.

In the embodiment shown in FIG. 9, the method 900 begins 910 with the archive system 120 detecting a trigger for archiving a snapshot. As discussed above with respect to FIG. 8, the trigger may be the expiration of a backup retention period, or other event or action specified by a backup retention policy. The archive system 120 determines 920 whether some or all of the snapshot data is already stored in the archive data store 126. As discussed above with respect to FIG. 2, the archive interface module 114 may check one or more backup reference entries associated with the snapshot in the backup metadata store 118 to determine whether the data has already been stored in the archive data store 126. If a backup reference entry in the backup metadata store 118 points to a storage location in the archive data store 126, the data has already been stored in the archive data store 126. If the archive system 120 determines that the snapshot data is already stored in the archive data store 126, the process proceeds to step 940. If the archive system 120 determines that the data is not already stored in the archive data store 126, the archive system 120 copies 930 the snapshot data from the backup snapshot store 116 to the archive data store 126. In one embodiment, if a portion of the snapshot data is already stored in the archive data store 126, the archive system 120 copies the portion that is not stored in the archive data store. The archive creation module 122 creates 940 a catalogue entry for the archived snapshot in the archived catalogue store 128. As described above with respect to FIG. 6, the catalogue entry may include a file name and position data, as well as other file metadata.

The archive interface module 114 determines 950 whether the backup metadata store 118 contains other snapshots that reference the same data as the archived snapshot. If the archive interface module 114 determines that there are one or more other snapshots that reference the same data as the archived snapshot, the archive interface module adds 960 the archive storage location to the backup reference entries in the backup metadata store 118 for the other snapshots and the process 900 ends. When the one or more other snapshots that reference the same data as the archived snapshot are archived at a later time, the archive storage location in the backup metadata store 118 will point to the location of the data, so the data need not be copied to the archive data store 126. This prevents data from being duplicated in the archive data store 126, which conserves storage space and computing resources. If the archive interface module 114 determines that there are no other snapshots that reference the same data as the archived snapshot, the data is no longer needed by the backup data store 116. The archive interface module 114 expires 970 the snapshot data from the backup data store 116. Data may be expired, for example, by being deleted or added to a queue for deletion from the backup data store 116. When data is expired from the backup data store 116, the archival retention period begins because no more catalogue entries that reference the data will be created in the archive catalogue store 128. Accordingly, the archive cleanup module 124 sets 980 the archive expiration time of the snapshot data from the archive data store 126. In one embodiment, setting the archive expiration time includes adding an archive expiration entry to the archive cleanup database in the archive data store 126. As described above with respect to FIG. 3, the archive expiration entry indicates an expiration time at which the first file data is designated for deletion from the archive data store 126. The archive expiration entry further indicates a storage location in the archive data store 126 so that the file may be located for deletion. In one embodiment, the archive expiration time is the archive creation time plus an archival retention period specified by an implementer of the file storage system. When the archive expiration period ends, the archive cleanup module 124 expires 990 the snapshot data from the archive data store 116 by, for example, deleting the snapshot data or designating the snapshot data for deletion from the archive data store.

Additional Considerations

The described embodiments have the advantage of reducing the use of storage space and computing resources required to backup and archive files compared to other methods that archive duplicate file data. For example, creating a time-based archive from an index-based backup reduces the computing resources required to expire archived data. Using a non-indexed catalogue is an advantageous data structure for an archive because it is highly stable. However, the non-indexed nature of the catalogue means that data may not be located using queries, but instead must be located using a brute force approach. Accordingly, expiring archive data becomes non-trivial. Data expiration is simplified by specifying an expiration time when an archive is created, which conserves computing resources at the expiration time. Reducing the storage space and computing resources required to backup and archive files allows users to more efficiently implement data redundancy measures by allowing users to maintain more backup and archive data at a lower cost.

Upon reading this disclosure, those of skill in the art will appreciate still additional alternative structural and functional designs for a system and a process for providing time-based data retirement for de-duplicated archival storage. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method, system, and storage medium disclosed herein without departing from the spirit and scope as defined in the appended claims.

In this description, the term "module" refers to computational logic for providing the specified functionality. A module can be implemented in hardware, firmware, or software, or a combination thereof. Where the modules described herein are implemented as software, the module can be implemented as a standalone program, but can also be implemented through other means, for example as part of a larger program, as a plurality of separate programs, or as one or more statically or dynamically linked libraries. In one embodiment, program modules are stored on the storage device 708, loaded into the memory 706, and executed by the processor 702.

It will be understood that the named modules described herein represent one embodiment of the present invention, and other embodiments may include other modules. In addition, other embodiments may lack modules described herein or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the networked computing environment 100. Alternatively, hardware or software modules may be stored elsewhere within networked computing environment 100. The networked computing environment 100 includes hardware elements necessary for the operations described here, including one or more processors, high speed memory, hard disk storage and backup, network interfaces and protocols, input devices for data entry, and output devices for display, printing, or other presentations of data.

Numerous variations from the system architecture of the illustrated networked computing environment 100 are possible. The components of the networked computing environment 100 and their respective functionalities can be combined or redistributed. For example, a single computer coupled with arrays of backup and archive storage may control the backup system 110 and the archive system 120.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

What is claimed is:

1. A method for providing time-based data retirement for de-duplicated archival storage, the method comprising:

generating, in a backup snapshot store, a plurality of backup snapshots of data from one or more client devices;

storing first file data from a first backup snapshot of the plurality of backup snapshots in an archive data store, the storing comprising copying the first file data from the backup snapshot store comprising deduplicated file data from the plurality of backup snapshots;

creating a first catalogue entry for the first backup snapshot, the first catalogue entry comprising a storage location of the first file data in the archive data store;

generating, in the backup snapshot store, one or more additional backup snapshots of the data from the one or more client devices;

determining that the first file data is not associated with any files in the backup snapshot store based on the additional backup snapshots;

designating the first file data for deletion from the backup snapshot store; and responsive to determining that the first file data is not associated with any files in the backup snapshot store, adding an archive expiration entry to an archive cleanup database, the archive expiration entry indicating an expiration time at which the first file data is designated for deletion from the archive data store.

2. The method of claim 1, further comprising designating the first file data for deletion from the archive data store at the expiration time.

3. The method of claim 1, wherein the archive expiration entry comprises the expiration time and a storage location of the first file data in the archive data store.

4. The method of claim 1, wherein the storing of the first file data comprises determining, from a backup metadata database, whether the first file data is already stored in the archive data store, wherein the first file is copied from the backup snapshot store responsive to determining that the first file data is not already stored in the archive data store.

5. The method of claim 1, wherein determining that the first file data is not associated with any files in the backup snapshot store based on the additional backup snapshots comprises querying a backup reference index for the first file data, the backup reference index stored in a backup metadata store.

6. The method of claim 1, wherein storing the first file data occurs responsive to the expiration of a backup retention period.

7. The method of claim 1, wherein adding the archive expiration entry to the archive cleanup database comprises determining an archive retention policy stored in the archive data store.

8. A system for providing time-based data retirement for de-duplicated archival storage, the system comprising:

a processor; and a memory storing a computer program product that, when executed by the processor, causes the processor to:

generate, in a backup snapshot store, a plurality of backup snapshots of data from one or more client devices;

store first file data from a first backup snapshot of the plurality of backup snapshots in an archive data store, the storing comprising copying the first file data from the backup snapshot store comprising deduplicated file data from the plurality of backup snapshots;

create a first catalogue entry for the first backup snapshot, the first catalogue entry comprising a storage location of the first file data in the archive data store;

generate, in the backup snapshot store, one or more additional backup snapshots of the data from the one or more client devices;

determine that the first file data is not associated with any files in the backup snapshot store based on the additional backup snapshots;

designate the first file data for deletion from the backup snapshot store; and responsive to determining that the first file data is not associated with any files in the backup snapshot store, add an archive expiration entry to an archive cleanup database, the archive expiration entry indicating an expiration time at which the first file data is designated for deletion from the archive data store.

9. The system of claim 8, wherein the computer program product further causes the processor to designate the first file data for deletion for the archive data store at the expiration time.

10. The system of claim 8, wherein the archive expiration entry comprises the expiration time and a storage location of the first file data in the archive data store.

11. The system of claim 8, wherein the storing of the first file data comprises determining, from a backup metadata database, whether the first file data is already stored in the archive data store, wherein the first file is copied from the backup snapshot store responsive to determining that the first file data is not already stored in the archive data store.

12. The system of claim 8, wherein determining that the first file data is not associated with any files in the backup snapshot store based on the additional backup snapshots comprises querying a backup reference index for the first file data, the backup reference index stored in a backup metadata store.

13. The system of claim 8, wherein storing the first file data occurs responsive to the expiration of a backup retention period.

14. The system of claim 8, wherein adding the archive expiration entry to the archive cleanup database comprises determining an archive retention policy stored in the archive data store.

15. A non-transitory computer-readable medium storing computer program code comprising instructions that, when executed, cause one or more processors to:

generate, in a backup snapshot store, a plurality of backup snapshots of data from one or more client devices;

store first file data from a first backup snapshot of the plurality of backup snapshots in an archive data store, the storing comprising copying the first file data from the backup snapshot store comprising deduplicated file data from the plurality of backup snapshots;

create a first catalogue entry for the first backup snapshot, the first catalogue entry comprising a storage location of the first file data in the archive data store;

generate, in the backup snapshot store, one or more additional backup snapshots of the data from the one or more client devices;

determine that the first file data is not associated with any files in the backup snapshot store based on the additional backup snapshots;

designate the first file data for deletion from the backup snapshot store; and responsive to determining that the first file data is not associated with any files in the backup snapshot store, add an archive expiration entry to an archive cleanup database, the archive expiration entry indicating an expiration time at which the first file data is designated for deletion from the archive data store.

16. The computer-readable medium of claim 15, wherein the instructions further cause the one or more processors to designate the first file data for deletion for the archive data store at the expiration time.

17. The computer-readable medium of claim 15, wherein the archive expiration entry comprises the expiration time and a storage location of the first file data in the archive data store.

18. The computer-readable medium of claim 15, wherein the storing of the first file data comprises determining, from a backup metadata database, whether the first file data is already stored in the archive data store, wherein the first file is copied from the backup snapshot store responsive to determining that the first file data is not already stored in the archive data store.

19. The computer-readable medium of claim 15, wherein determining that the first file data is not associated with any files in the backup snapshot store based on the additional backup snapshots comprises querying a backup reference index for the first file data, the backup reference index stored in a backup metadata store.

20. The computer-readable medium of claim 15, wherein storing the first file data occurs responsive to the expiration of a backup retention period.

* * * * *